United States Patent [19]

Desorcie et al.

[11] Patent Number: 5,010,118

[45] Date of Patent: Apr. 23, 1991

[54] UV CURABLE NON-TOXIC EPOXYSILICONE RELEASE COATING COMPOSITIONS

[75] Inventors: James L. Desorcie; Michael J. O'Brien, both of Clifton Park, N.Y.

[73] Assignee: General Electric Company, Schenectady, N.Y.

[21] Appl. No.: 369,798

[22] Filed: Jun. 22, 1989

[51] Int. Cl.$^5$ .................. C08F 2/46; C08G 59/22; C08J 3/28
[52] U.S. Cl. ..................................... 522/31; 522/148; 522/170
[58] Field of Search .................. 522/31, 170, 148

[56] References Cited

U.S. PATENT DOCUMENTS 4,279,717 7/1981 Eckberg et al. ................ 204/159.13
4,816,496 3/1989 Wada et al. ........................... 522/17

Primary Examiner—Marion E. McCamish
Assistant Examiner—Mark A. Chapman
Attorney, Agent, or Firm—William A. Teoli; James C. Davis, Jr.; William H. Pittman

[57] ABSTRACT

There is provided a curable substantially uniform mixture of an epoxysilicone, a polyarylonium salt and a compatibilizer in the form a mixture of a long chain alkyl substituted phenol and an alkane diol. The curable mixture is convertable to a non-toxic, tack free adherent release coating for pressure sensitive adhesives.

8 Claims, No Drawings

UV CURABLE NON-TOXIC EPOXYSILICONE RELEASE COATING COMPOSITIONS

CROSS REFERENCE TO RELATED APPLICATIONS

References made to copending applications of Riding et al, Ser. No. 225,986, now U.S. Pat. No. 4,952,657 filed July 29, 1988 for Silicone Release Coating Compositions and Eckberg et al, Ser. No. 332,646 filed on Apr. 3, 1989 for Ultraviolet Radiation Curable Epoxysilicone/Polyol systems, which are assigned to the same assignee as the present invention and incorporated herein by reference.

BACKGROUND OF THE INVENTION

The present invention relates to UV curable organopolysiloxane compositions which are convertible to nontoxic, adherent, release coatings when applied onto a paper or a plastic substrate and cured thereon. More particularly, the present invention relates to the use of a compatibilizer, such as a mixture of a $C_{(8-20)}$ alkylphenol and an alkanediol, such as butanediol, for facilitating the incorporation of a photoinitiator, such as a polyaryloniumhexafluorometalloid salt, for example, a diaryliodoniumhexafluoroantimonate salt into an epoxysilicone fluid to provide a UV curable silicone composition convertible to a non-toxic release coating.

Prior to the present invention, as shown by Eckberg et al U.S. Pat. No. 4,279,717, UV curable epoxysilicone coating compositions were provided by using bisaryliodonium salts such as bis(dodecylphenyl) iodonium salts, in combination with an epoxy functional silicone. As taught by Eckberg et al, the efficiency of the bisaryliodonium photo initiator, was highly dependent upon whether the photoinitiator could be readily dispersed or dissolved into the epoxy functional silicone fluid. Even though the bis(alkylatedphenyl)iodonium salts taught by Eckberg et al have been found to rapidly dissolve in the epoxy silicone fluid, experience has shown that the resulting UV curable epoxysilicone composition often cannot satisfy the rigid toxicity standards required for making adherent silicone release coatings used in food applications.

As taught in the copending application of Crivello et al, Ser. No.171063, now U.S. Pat. No. 4,882,201 filed Mar. 21, 1988, for Non-Toxic Arylonium Salts, UV Curable Coating Compositions and Food Packaging Use, the use of certain arylonium salts is described having at least one nuclear bound-OR group attached to the aryl nucleus by a carbon-oxygen linkage, where R is an alkyl radical having at least eight carbon atoms. These arylonium salts exhibit substantially less toxicity than prior art arylonium salts free of such nuclear bound OR groups. Experience has shown however, that although such arylonium salts, for example, diaryliodoniumhexafluoroantimonate salts exhibit reduced toxicity and accordingly satisfy food packaging standards, they have been found to be substantially incompatible with epoxysilicones having less than about 12 mole percent of condensed epoxy organosiloxy units, based on the total moles of diorganosiloxy units in such epoxysilicone. It has been further found that unless the non-toxic arylonium salt is miscible with the epoxysilicone, a heterogenous curable coating mixture can be formed having a tendency to readily smear or streak after being subjected to curing conditions on the surface of a suitable substrate, such as plastic or paper. Improved diaryliodonium salt compatability can be achieved by raising the epoxy mole percent in the expoysilicone. However, as the condensed epoxy content rises in the epoxysilicone, the release characteristics of the cured coating are adversely affected.

It would be desirable therefore to provide nontoxic UV curable silicone coating compositions utilizing epoxysilicone fluid having less than about 12 mole percent of condensed epoxyorganosiloxy units, based on the total moles of condensed diorganosiloxy in such epoxy silicone fluid, and capable of providing non-toxic, non-smearing release coatings on paper or plastic substrates. It also would be desirable to provide substantially uniform UV curable epoxysilicone compositions which do not contain incompatable photoinitiators having a tendency to settle out of the curable mixture upon standing.

SUMMARY OF THE INVENTION

The present invention is based on the discovery that a mixture of a $C_{(8-20)}$ alkylphenol and a $C(4-12)$ alkane diol significantly improves the solubility of non-toxic arylonium salts, such as diaryliodonium salts, or triarylsulfonium salts having at least one nuclear bound-OR radical, as previously defined, in epoxysilicones having less than about 12 mole percent chemically combined epoxysiloxy units, based on the total moles of chemically combined organosiloxy units in such epoxysilicone.

STATEMENT OF THE INVENTION

There is provided by the present invention, UV curable substantially uniform epoxysilicone compositions convertible to non-toxic release coatings comprising by weight (A) 100 parts of epoxysilicone having from 5 to 12 mole percent of condensed epoxysiloxy units, based on the total moles of chemically combined organosiloxy units of the epoxysilicone.

(B) 1 to 25 parts of a compatibilizer in the form of a mixture of (i) 1 to 25 parts of a $C_{(8-20)}$ alkylphenol and (ii) 0 to 15 parts of a $C_{(4-12)}$ alkanediol and (C) an effective amount of a polyaryloniumhexafluorometal, or metalloid salt, substituted with at least one nuclear bound alkoxy radical having at least 8 carbon atoms selected from the class consisting of diaryliodonium salts and triarylsulfonium salts.

The non-toxic arylonium salts which can be used in the practice of the present invention are selected from hexafluorometalloid salts such as phosphates, arsonates, and antimonates.

Some of the diaryliodonium salts which can be used in the practice of the present invention are for example,

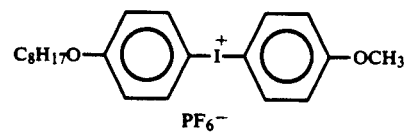

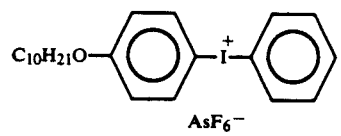

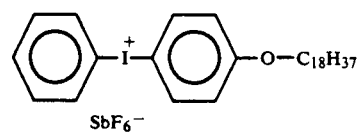
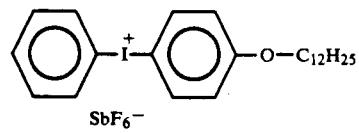
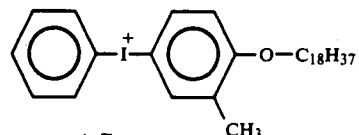
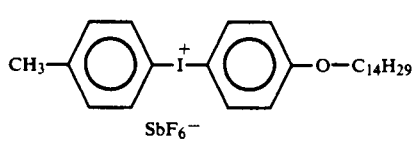
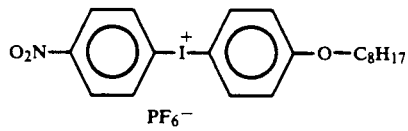
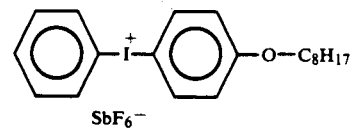
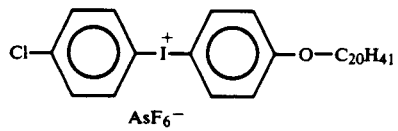
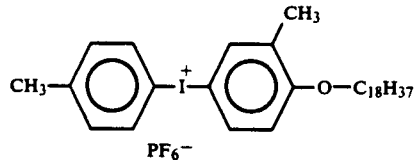

Some of the triarylsulfonium salts which can be used are, for example,

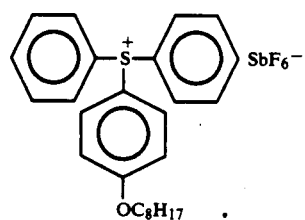

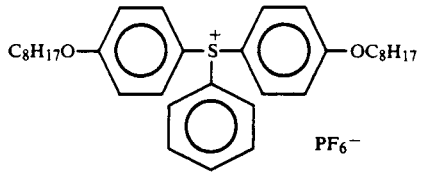
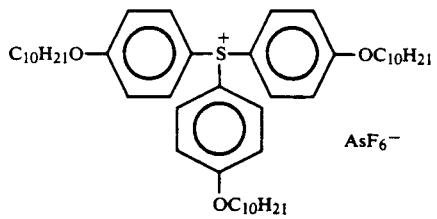
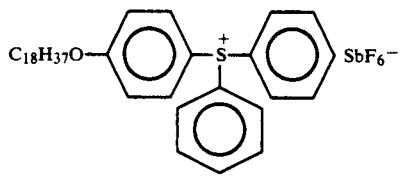
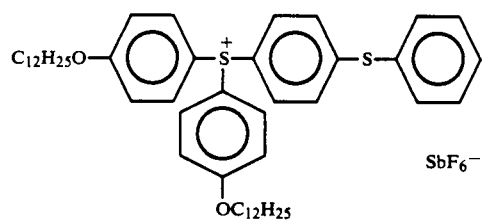

There are included by the epoxysilicone fluids used in the practice of the present invention, dialkylepoxy chain-stopped polydialkylalkylepoxysiloxane copolymers wherein the polysiloxane units contain lower alkyl substituents, notably, methyl groups. The epoxy functionality is obtained when some of the hydrogen atoms on the polysiloxane chain of a polydimethyl-methylhydrogensiloxane copolymer are reacted in a hydrosilylation addition reaction with other organic compounds having both ethylenic unsaturation and epoxide functionality. The ethylenically unsaturated compound will add to a polyhydroalkylsiloxane to form a copolymer in the presence of catalytic amounts of platinum.

Additional precious metal catalysts which can be used can be selected from the group of platinum-metal complexes which includes complexes of ruthenium, rhodium, palladium, osmium, and iridium.

Optionally, the epoxysilicone fluid also can comprise a pre-crosslinked epoxy functional polydialkyl-alkyl epoxysiloxane copolymer. The hydrosilylation reaction can be effected between the reaction product of a vinylic-or allylic-functional epoxide, and a vinyl functional siloxane cross-linking fluid having a viscosity of approximately 1 to 100,000 centipoise at 25° C., with a hydrogen functional siloxane precursor fluid having a viscosity of approximately 1 to 10,000 centipoise at 25° C. in the presence of an effective amount of precious metal catalyst.

Suitable vinylic or allylic-functional epoxides which can be used to make the above described epoxysilicone fluids are a cycloaliphatic epoxy compounds such as 4-vinylcyclohexeneoxide, vinylnorbornenemonoxide, dicyclopentadienemonoxide, and allylglycidylether.

The vinyl functional siloxane cross-linking fluid used in making some of the epoxysilicone fluids can be selected from the group consisting of dimethylvinyl chain-stopped linear polydimethylsiloxane, dimethylvinyl chain-stopped polydimethyl-methylvinyl siloxane copolymer, tetravinyltetramethylcyclotetrasiloxane and tetramethyldivinyldisiloxane. The hydrogen functional siloxane precursor fluid can be selected from the group consisting of tetrahydrotetramethylcyclotetrasiloxane, dimethylhydrogensiloxy chain-stopped linear polydimethylsiloxane, dimethylhydrogensiloxy or trimethylsiloxy chain-stopped polydimethyl-methylhydrogen siloxane copolymer and tetramethyldihydrodisiloxane.

In addition to the above described epoxysilicone fluids, there also can be used epoxysilicone fluids having chemically combined units of the formulas,

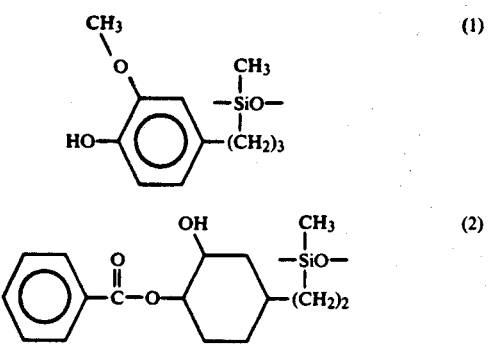

When the above-described epoxysilicone fluids are combined with an appropriate polyarylonium salt, an ultraviolet light cure reaction can be initiated in order to form a final product such as a solventless silicone release coating. The adhesion of these compositions to a substrate can be improved with the addition of a small amount of $\beta$-3,4-epoxycyclohexyl)ethyltrimethoxy silane.

Some of the $C_{(8-20)}$ alkylphenols which can be used in the practice of the present invention as part of the compatibilizer include compounds, such as decylphenol, dodecylphenol, and octadecylphenol.

Additional $C_{(8-20)}$ alkyl substituted phenols can be made by the procedure shown by Anionic Surfactants Part I, by George E. Hinds, Petroleum-Based Raw Materials For Anionic Surfactants, Chap. 2, p. 22–23, Warner M. Linfield, Marcel Decker Inc., N.Y. 1976, which is incorporated herein by reference. For example, phenols can be alkylated with an appropriate olefin in the presence of boron trifluoride, aluminum chloride and other Lewis acids.

$C_{(4-12)}$ alkanediols which Can be used in the practice of the present are for example 1,4-butanediol, 1,3-butanediol, 2-ethyl-1,3-hexanediol, 1,6-hexanediol, 2-methyl-2,4-pentanediol, 1,4-cyclohexanedimethanol, and 1,12-dodecanediol.

The amount of arylonium salt which has been found to be effective in the practice of the present invention is for example 0.1% to 2% by weight based on the weight of the total UV curable mixture, and preferably 0.25% to 1% by weight.

In the practice of the invention, the UV curable epoxysilicone composition can be made by blending together the arylonium salt with the epoxysilicone fluid, along with the compatibilizer as previously defined. Although the order of mixing is not critical, a preferred procedure is to premix the arylonium salt with the alkylphenol and the alkanediol to form a solution, to facilitate blending the resulting solution with the epoxysilicone fluid.

After a substantially uniform blend of the various ingredients has been made in the previously defined proportions by weight, the resulting UV curable epoxysilicone composition can be then applied to a substrate such as paper, metal, foil, glass, PEK paper, SCK paper, polyethylene, polypropylene and polyester films. UV polymerization of the epoxysilicone compositions can be effected by exposing the composition to a radiation source capable of producing UV light in about the having about a 2000 A to about 3000 A wave length range. The lamp systems used to generate such radiation can consist of ultraviolet lamps, such as from 1 to 50 discharge lamps, for example, xenon, metallic halide, metallic arc, such as a low, medium or high pressure mercury vapor discharge lamp, etc. having an operating pressure of from a few milli torr to about 10 atmospheres, etc., can be employed. Typical lamps which can be employed for providing ultraviolet radiation are, for example, medium pressure arcs, such as the GE H3T7 arc, etc. The cures may be carried out with a combination of various lamps, some or all of which can operate in an inert atmosphere.

In order that those skilled in the art may be better able to practice the present invention the following examples are given by illustration and not by way of limitation. All parts are by weight unless otherwise indicated.

EXAMPLE 1

A poly(dimethyl-methylepoxycyclohexylethyl)siloxane having 11 mole % of methyl-epoxycyclohexylethylsiloxy units based on the total moles of dimethylsiloxy units and methylepoxycyclohexylethylsiloxy units was prepared in accordance with the procedure shown by Eckberg et al, U.S. Pat. No. 4,279,717, which is incorporated herein by reference. More particularly, there was used a dimethylvinyl chain stopped polydimethylsiloxane fluid and a trimethylsiloxy chain-stopped polydimethylmethylhydrogensiloxane fluid mixed with 4-vinylcyclohexeneoxide. Hexachloroplatinic acid dissolved in tetramethylcyclotetrasiloxane was added to the resulting solution. The mixture was refluxed for several hours and then stripped at 120° C. under vacuum.

(4-octyloxyphenyl)phenyliodonium hexafluoroantimonate was prepared in accordance with the following procedure: A mixture of 224 grams (3 mols) of phenol in the form of a 88% aqueous solution, 193 grams (1 mol) of 1-bromooctane, 30 grams of tetra-n-butylammonium bromide, 224 grams (3 mols) of potassium hydroxide pellets, 500 ml of water and 500 ml of toluene was stirred under a nitrogen atmosphere while it was refluxing for a period of 16 hours. The reaction mixture was allowed to cool and the organic phase was washed with 500 ml, 0.5N sodium hydroxide to remove excess phenol. The toluene layer was washed with two 500 ml portions of water and the toluene was removed using a rotary evaporator. A quantitative yield of 98% pure octylphenyl ether was obtained based on gas chromotography and method of preparation.

There was added dropwise with stirring, 520 grams (2.4 mols) of 35% peracetic acid to 208 grams (1 mol), 98% pure iodobenzene at a rate sufficient to maintain the temperature of the mixture between 40° to 45° C. for one hour. The mixture was then maintained at 40° C. for an additional hour and a yellow solution was obtained. After about 20 minutes, a precipitate of iodosobenzene diacetate began to form and the solution became quite thick. While maintaining the reaction mixture at 40° C., there was gradually added 290 grams (1.57 mol) of p-toluene sulfonic acid monohydrate. As the reaction proceeded, the solution became perceptably more fluid and then once again thixotropic. The product, phenyliodosotosylate precipitated. The reaction temperature was maintained at 40° C. for two hours after addition had been completed. The product was isolated by suction filtration. It was obtained in an 84–97% yield.

There was added 5 ml of acetonitrile followed by 1.5 ml of glacial acetic acid as a catalyst to a mixture of 24.5 grams (0.0625 mol, 20% excess) of phenoiodosotosylate and 10.3 grams (0.05 mol) of octylphenyl ether. Upon addition of the acid with stirring, a deep green color was formed. The reaction mixture was heated and stirred at 40° C. for two hours. During this period, the initial heterogeneous solution became homogeneous with the formation of a yellow-orange solution. The solution was cooled and there were added 150 ml of water. The product crystallized from the oil and was isolated by suction filtration. It was washed thoroughly with water followed by a small amount of n-heptane. After air drying, the yield of the product was 25.5 grams (95%) with a melting point of 115°–118° C. After recrystallization from a toluene/n-heptane mixture, the melting point of the product was raised to 119°–121° C. Based on method of preparation, the product was (4-octyloxyphenyl) phenyliodonium tosylate.

There was added 1600 ml of acetone with stirring, to a mixture of 747.6 grams (1.28 mol) of the above tosylate salt and 333.6 grams (1.28 mol) sodium hexafluoroantimonate. The mixture was stirred for one hour at room temperature. The sodium tosylate was filtered off and the volume of the acetone solution reduced on a rotary evaporator to approximately one third. The acetone solution was then poured into distilled water. The aqueous layer was decanted from the oil which formed. The oil was then washed with 3×1000 ml portions of water. On cooling and stirring, the oil crystallized. The product was purified by dissolving in a minimum amount of methanol and triturating with a large quantity of water. A crystalline product was obtained by filtering and washing the isolated product with water followed by drying at 40° C. in a vacuum oven. There was obtained an 82–94% yield of (4-octyloxyphenyl)-phenyliodonioum hexafluoroantimonate having a melting point of 59°–61° C.

A variety of UV curable epoxysilicone compositions were prepared by blending various mixtures of the diaryliodonium hexafluoroantimonate and 2-ethyl-1,3-hexandiol with mixtures of the epoxysilicone and dodecylphenol. Table 1 shows the UV curable silicone compositions prepared. The proportions of the various ingredients are shown in weight percent, "Epoxysilicone" is poly(dimethylmethylepoxycyclohexylethyl) siloxane having 11 mole percent of methylepoxycyclohexylethylsiloxy units, "Iodonium salt" is (4-octyloxyphenyl) phenyliodonium hexafluoroantimonate, and "Diol" is 2-ethyl-1,3-hexanediol

TABLE 1

| Sample | Epoxysilicone | Dodecylphenol | Diol | Iodonium Salt |
|---|---|---|---|---|
| 1 | 95.0 | 1.0 | 3.5 | 0.5 |
| 2 | 95.0 | 2.0 | 2.5 | 0.5 |
| 3 | 95.0 | 3.0 | 1.5 | 0.5 |
| 4 | 95.0 | 4.0 | 0.5 | 0.5 |

Initially, samples 1–4 were found to be completely homogeneous. Samples 1–3 remained homogeneous for 14 days, while crystals of iodonium salt were detected in sample 4 following 5 days at room temperature. It was further found that when either the dodecylphenol or the 2-ethyl-1,3-hexanediol were excluded from the Uv curable epoxysilicone composition, the iodonium salt separated from the mixture. It was further found that nonylphenol was considerably less effective as a compatibilizer for the epoxysilicone and the iodonium salt when used in combination with the diol. In addition, a mixture of 99.5% by weight of the epoxysilicone and 0.5% by weight of the iodonium salt was found to be heterogeneous.

Samples 1, 2, and 3, and epoxysilicone-iodonium salt mixture free of compatibilizer were applied onto polyethylene craft (PEK) having a width of 18 inches and a thickness of 4 mils using a Black-Clawson pilot converting apparatus equipped with an offset grauvre coating device and two Fusion Systems UV lamps. The initial coating thicknesses were about 1/10 mils. It was found that samples 1–3 cured well at line speeds of 600 feet per minute and no evidence of coating smear or migration onto cellophane adhesive tape was detected. In addition, the heterogeneous epoxysiliconeiodonium salt mixture was found to provide a coating which readily smeared even though the coating speed was reduced to 50 feet/minute.

EXAMPLE 2

Several of the coated polyethylene kraft (PEK) samples prepared in accordance with the procedure of Example 1 having epoxysilicone compositions corresponding to samples 1, 2 and 3 were then evaluated for their release characteristics. Laminates were made by contacting the coated PEK strips with various pressure sensitive adhesives (PSA's) which included Bondmaster ® adhesive, a rubber based adhesive in a toluene-hexane solvent of the National Starch and Chemical Corp of Bridgewater, N.J., and Gelva ® emulsion 2397, a water based acrylic and Gelva ® 263, a solvent based acrylic of Monsanto Co, St. Louis, Mo. After the PSA's were applied onto the coated PEK, laminates were made by applying super calendered kraft (SCK) to the coated PEK. Release measurements in units of grams/2 inches were made at pulls of 300 inches per minute at a 180° angle. The release measuring apparatus employed could be directly read in terms of the aforementioned grams/2 inch units. The respective laminates were measured over aging periods at 0 time, "initial", and after one day, one week, two weeks, and four weeks. The following results in grams/2 inch were obtained, where "laminate age" means that the laminate was freshly pulled after the test period.

TABLE II

| Sample | Initial | Laminate Age | | | |
| | | 1 day | 1 week | 2 week | 4 week |
|---|---|---|---|---|---|
| | | (Rubber Adhesive) | | | |
| 1 | 45–55 | 45–55 | 45–55 | 45–55 | 45–55 |
| 2 | 45–55 | 40–55 | 40–50 | 40–50 | 45–55 |

TABLE II-continued

| Sample | Initial | Laminate Age | | | |
|---|---|---|---|---|---|
| | | 1 day | 1 week | 2 week | 4 week |
| 3 | 45-55 | 45-55 | 40-50 | 45-55 | 45-55 |
| | | (Water-Based Acrylic) | | | |
| 1 | 55-65 | 50-60 | 55-65 | 50-60 | 45-55 |
| 2 | 50-60 | 45-55 | 50-60 | 55-65 | 40-50 |
| 3 | 55-70 | 55-65 | 55-65 | 55-65 | 45-55 |
| | | (Solvent-Based Acrylic) | | | |
| 1 | 65-75 | 55-70 | 55-65 | 45-55 | 45-55 |
| 2 | 55-65 | 45-55 | 45-55 | 40-50 | 45-55 |
| 3 | 55-65 | 50-60 | 45-55 | 45-55 | 45-55 |

The above results show that substantially consistent results are obtained with the release characteristics of the rubber adhesive after an aging period of up to 4 weeks, while a slight reduction is experienced with the water base and solvent based acrylic adhesive after the same aging period.

In order to demonstrate that cured release coatings prepared in accordance with the practice of the present do not migrate to a PSA, such as a solvent based acrylic adhesive, when placed in contact thereto, the initial adhesion value of the PSA was measured on a glass substrate. It was found to be greater than 1250 grams/2 inch. The PSA was then allowed to contact the epoxysilicone coated kraft over a period of up to 4 weeks. During the 4 week contact period, the PSA was periodically separated from the epoxysilicone treated kraft. The adhesive value of the PSA was determined after a one week, two week and four week contact period. The following results were obtained,

TABLE III

| Sample | Initial | Laminate Age | | |
|---|---|---|---|---|
| | | 1 Week | 2 Week | 4 Week |
| 1 | >1250 | >1250 | >1250 | >1250 |
| 2 | >1259 | >1250 | >1250 | >1250 |

The above results show that no migration of the epoxysilicone release coating occurred which could impair the adhesive characteristics of the PSA.

EXAMPLE 3

UV curable epoxysilicone compositions were prepared in accordance with the procedure of Example 1, and photocured on super-calendered kraft (SCK paper). There was used 94% by weight of epoxysilicone having 11 mole % of epoxy, 2% by weight of dodecylphenol, 3% by weight of 2-ethyl-1,3-hexenediol and 1% by weight of (4-octyloxyphenyl)phenyliodonium hexafluoroantimonate salt. The UV curable epoxysilicone was applied and cured in accordance with the procedure of example 1, at a rate of 400 feet per minute.

Laminates were prepared using solvent based rubber PSA's and acrylic PSA's which were placed in contact with the SCK treated UV cured release coating. Release measurements were made in accordance with the procedure of example 1 over a 4 week aging period. The following results were obtained:

TABLE IV

| Adhesive | Initial | 1 Day | 1 Week | 2 Week | 4 Week |
|---|---|---|---|---|---|
| Rubber | 80-95 | 90-100 | 85-100 | 90-100 | 105-120 |
| Solvent Acrylic | 65-75 | 65-90 | 65-80 | 75-85 | 80-90 |

The above release values are substantially higher than the release values obtained with the polyethylene kraft (PEK) of example 2. One possible explanation is that a greater degree of absorption of the uncured epoxysilicone occurs during the initial treatment of the SCK, as compared to the PEK.

EXAMPLE 4

An additional UV curable epoxysilicone composition was prepared using 90% by weight of an epoxysilicone having 7 mole % of methylepoxycyclohexylethylsiloxy units, 4% by weight of dodecylphenol, 5% by weight of 2-ethyl-1,3-hexandiol and 1% by weight of the (4-octyloxyphenyl) phenyliodonium hexafluoroantimonate salt. The resulting UV curable epoxysilicone composition was then applied onto SCK at a line speed of 400 feet per minute and cured in accordance with the procedure of example 1. Laminates were prepared using solvent based rubber PSA's and solvent based acrylic PSA's on a SCK substrate. A four week aging period was used to evaluate the release characteristics of the various laminates in terms of grams/2 inch release measurements. The following results were obtained:

TABLE V

| Adhesive | Initial | 1 Day | 1 Week | 2 Week | 4 Week |
|---|---|---|---|---|---|
| SBR | 120-140 | 130-150 | 170-190 | 140-160 | 150-170 |
| Solvent Acrylic | 120-140 | 120-140 | 125-145 | 110-130 | 110-130 |

The above results show that good cures can be obtained with the epoxysilicone release coating on the SCK, since undercured coatings usually lead to dramatic release increases, such as over a 100 grams/2 inch change over 1-2 weeks.

An additional UV curable epoxysilicone release composition was prepared using 90% by weight of epoxysilicone having about 11 mole % by weight of epoxy, 3½% by weight of dodecylphenol, 5% by weight of 2-ethyl-1,3-hexandiol and 1½% by weight of the (4-octyloxyphenyl) phenyliodonium hexafluoroantimonate salt. The resulting UV curable composition was found to be readily curable on SCK at 500 feet per minute to provide satisfactory cured epoxysilicone release coatings.

EXAMPLE 5

Bis(4-dodecyloxyphenyl)phenylsulfonium hexafluoroantimonate was prepared by initially synthesizing 4,4'-didodecyloxydiphenylsulfide. The aforementioned diphenylsulfide was prepared by refluxing a mixture consisting of 10.0 grams of thiodiphenol, 23 grams of n-dodecylbromide, 20 ml of toluene, 20 ml of water, 3.7 grams of sodiumhydroxide and 1.6 grams of tetra-n-(butylammoniumbromide for 48 hours. After the mixture was refluxed under nitrogen with stirring, the mixture was allowed to cool to room temperature and treated with water and a saturated sodium chloride solution. After drying over anhydrous sodium sulfate, the solution was filtered, and concentrated under reduced pressure. Recrystallization of the crude product from isopropyl alcohol followed by drying under vacuum gave 18.1 grams (71% yield) of the product as a white crystalline solid having a melting point of 56°-58° C. Based on method of preparation and ¹HMNR data the product was 4,4'-didodecyloxydiphenylsulfide.

Bis(4-dodecyloxyphenyl)phenyl sulfoniumhexafluoroantimonate was prepared by heating 4,4'-didodecyloxydiphenylsulfide, 4.7 grams of diphenyliodonium hexafluoroantimonate, and 80 milligrams of copper benzoate to 155° C. for 3.5 hours. Based on method of preparation, and $^1$HNMR there was obtained a 80% yield of bis(4-dodecyloxyphenyl)phenylsulfoniumhexafluoroantimonate.

A UV curable composition was made by incorporating 50 milligrams of the above sulfonium salt with an epoxysilicone fluid having an average of about 20 condensed dimethylsiloxy units, 1.5 condensed methylepoxycyclohexylethylsiloxy units and 1.5 methylpropylphenylsiloxy units of formula 1 above. Although the mixture was stirred and heated, the mixture was still heterogenous. Therefore, 0.1 gram of dodecylphenol was added. The mixture was then stirred and heated and a clear solution was obtained. The mixture remained homogeneous upon cooling to room temperature. A one gram sample of the mixture was then diluted with 4 grams of a 1:1 mixture of hexane-acetone and the result was coated on a sheet of polyethylene coated Kraft- (PEK). Curing was accomplished by passing the coated PEK through an RPC model QC1202UV processor at a line speed of 200 feet/minute using two mercury arc lamps at 300 watts power. The resulting cured release liner was then contacted with National Starch rubber based adhesive (NSRB) using super calendered Kraft as a face stock. The laminate was allowed to age for one week then measured for its release characteristics. There was obtained a 40–50 grams/2 inch adhesion value on a Scott Machine Products tester using a 180° peel at 400 inches/minute.

EXAMPLE 6

Bis(4-dodecyloxyphenyl)(4-thiophenoxyphenyl) sulfonium hexafluoroantimonate was prepared by initially dissolving 5 grams of 4,4'-didodecyloxydiphenylsulfide in 20 ml of chloroform. There was added 0.5 grams of tetra-n-butylammonium bromide, 3 grams of Oxone ® oxidant (KHSO$_5$; KHSO$_4$; K$_2$SO$_4$) of the Dupont DeNemours Company and 15 ml of water. The resulting mixture was stirred vigorously for about 30 minutes and the organic layer was collected, washed with two portions of water, and then dried over anhydrous sodium sulfate. After filtration, the solvent was removed under reduced pressure yielding a yellow solid which was slurried with hexane and collected by suction filtration. The resulting product was recrystallized from ethanol and dried under vacuum. There was obtained 4.1 grams of 4,4'-didodecyloxydiphenylsulfoxide as a white crystalline solid having a melting point of 66.5°–69° C. Its identity was further confirmed by $^1$HNMR.

4,4'-didodecyloxydiphenylsulfoxide (2.0 grams) and diphenylsulfide (0.65 grams) were dissolved in 8 ml of chloroform and 5 ml of acetic anhydride. The mixture was cooled to 10° C. and 0.75 grams of concentrated sulfuric acid was added dropwise. The mixture was then allowed to warm to room temperature and it was stirred for one hour. The mixture was then added to a solution of 1.06 gram of sodium hexafluoroantimonate and 60 ml of water. There was then added 10 ml of chloroform and the mixture was vigorously stirred for 30 minutes. The organic layer was collected, washed with water, dried over anhydrous sodium sulfate, filtered and concentrated to give a yellow oil. The product was washed twice with n-heptane, the solvent was carefully decanted and the oil dried at 60° C. in a vacuum. There was obtained 2.9 grams (85% yield) of bis(4-dodecyloxyphenyl)(4-thiophenoxyphenyl)sulfoniumhexafluoroantimonate. Its identity was further confirmed by $^1$HNMR.

A UV curable formulation was prepared by blending 0.1 gram of the above sulfoniumhexafluoroantimonate salt with 20 grams of the epoxysilicone used in Example 5. The resulting mixture was found to be heterogenous. However, addition of 0.6 grams of dodecylphenol provided a clear, miscible formulation. A one gram sample of the curable mixture was diluted with 4 grams of a 1:1 mixture of hexaneacetone and the resulting formulation was coated on PEK. It was cured under the same conditions as Example 5. The one week aged release value for the laminate formed with NSRB was 50–60 grams/2 inch.

EXAMPLE 7

A UV curable mixture was prepared by blending 0.1 grams of the bis(4-dodecyloxyphenyl)(4-thiophenoxyphenyl)sulfoniumhexafluoroantimonate salt of Example 6, 20 grams of an epoxysilicone consisting essentially of an average of about 20 condensed dimethylsiloxy units, 1.5 methylepoxycyclohexylsiloxy units and 1.5 methylarylestersiloxy units of formula 2, above, and chainstopped with dimethylsiloxy units. The mixture was 0 almost completely homogenized by adding 0.1 gram of 2-ethyl-1,3-hexenediol and 0.2 grams of dodecylphenol along with heating and stirring. The resulting UV curable epoxysilicone composition remained homogeneous upon storage at room temperature. A two gram sample of the formulation was diluted with 4 grams of a 1:1 mixture of hexane-acetone. The resulting mixture was coated on PEK and cured with the RPC processor at 130 ft/minute using two mercury arc lamps at 300 watts, in accordance with Example 5. A one week aged release value for the resulting release coated liner in contact with an NSRB was 270–290 grams/2 inches.

EXAMPLE 8

Tri(4-octyloxyphenyl)sulfonium hexafluoroantimonate was prepared by initially refluxing a mixture of 10 grams thiodiphenol, 17.9 grams of an octylbromide, 20 ml of toluene, 20 ml of water, 3.7 grams of sodium hydroxide, and 1.6 grams of tetra-n-butylammonium bromide under nitrogen. The mixture was refluxed and stirred for 24 hours at which time the mixture was allowed to cool to room temperature. It was washed twice with 10% aqueous sodium hydroxide and saturated sodium chloride solution. After drying over anhydrous sodium sulfate, the organic phase was filtered and concentrated under reduced pressure. There was obtained 18.3 grams of a crude orange solid. It was crystallized from ethanol and dried under vacuum. There was obtained 16.7 grams of a white crystalline solid having a melting point of 40°–42° C. Based on method of preparation and $^1$HNMR the product was 4,4'-dioctyloxydiphenylsulfide.

A mixture of 2.1 grams of 4,4'-dioctyloxydiphenylsulfide, 10 ml of chloroform, 0.1 gram of tetra-n-butylammoniumbromide, 1.5 grams of Oxone oxidant and 10 ml of water was stirred for 5.5 hours. An additional 400 milligrams of Oxone oxidant, dissolved in 4 ml of water, was added. Stirring was continued an additional 2 hours. The chloroform layer was collected and washed with water and then dried over anhydrous sodium sulfate. After filtration, the solvent was removed under reduced pressure yielding a yellow solid which was slurried with hexane and collected by suction filtration. Based on method of preparation and $^1$HNMR there was obtained 1.2 grams (56% yield) of 4,4'-dioctyloxydiphenylsulfoxide.

There was added dropwise, 0.45 grams of concentrated sulfuric acid to a 10° C. mixture of 1.0 gram of 4,4'-dioctyloxydiphenylsulfoxide, 0.45 grams of octylphenylether, 5 ml of chloroform and 3.0 grams of acetic anhydride. The reaction mixture was then allowed to warm to room temperature. The initially dark purple mixture faded to dark yellow. After stirring for an hour at room temperature, the reaction mixture was added to a solution of 0.7 grams of sodium hexafluoroantimonate and 60 ml of water. There was then added 10 ml of chloroform to the hexafluoroantimonate solution. After stirring vigorously for 30-35 minutes, the organic layer was collected and washed with water, dried over anhydrous sodium sulfate, filtered, and concentrated to approximately ¼ of its original volume. Upon addition of n-heptane, the product separated out as a yellow oil. The solvent was then carefully decanted and the oil was washed with 2 fresh portions of n-heptane. Drying at 60° C. under reduced pressure provided tri(4-octyloxyphenyl)sulfonium hexafluoroantimonate as a light yellow oil. Its identity was further confirmed by $^1$HNMR.

A mixture of 0.1 gram of the tri(4-octyloxyphenyl)-sulfonium hexafluoroantimonate was combined with 20 grams of an epoxysilicone consisting essentially of an average of about 20 condensed dimethylsiloxy units, 0.6 methylarylestersiloxy units of formula 2, 2.4 methylepoxycyclohexylethylsiloxy units and chainstopped with trimethylsiloxy units. The mixture was found to be heterogeneous upon stirring and heating. There was then added 0.3 grams of dodecylphenol and 0.2 grams of 2-ethyl-1,3-hexanediol. Further stirring and heating resulted in a clear solution. The solution remained stable even upon storage at room temperature. A one gram sample of the UV curable formulation was diluted with 4 grams of a 1:1 mixture of hexane:acetone and the resulting mixture was coated on PEK. It was cured under an RPC processor at 200 ft/minute using 2 arc lamps at 300 watts. A one week aged release for laminate using NSRB was 65-80 grams/ 2 inches.

Although the above examples are directed to only a few of the very many variables which can be used in the practice of the present invention to make the UV curable epoxysilicone release coatings, it should be understood that the present invention is directed to a much broader variety of UV curable epoxysilicone coating compositions set forth in the description preceding these examples by utilizing a much broader variety of epoxysilicones, compatibilizes in the form of the $C_{(8-20)}$ alkylphenols and $C_{(4-12)}$ alkanediols as well as the polyaryloniumhexafluoro metal or metalloid salts as set forth in the description preceding these examples.

What is claimed is:

1. UV curable substantially uniform epoxysilicone compositions convertible to nontoxic release coatings comprising by weight,
    (A) 100 parts of epoxysilicone having from 5 to 12 mole percent epoxysiloxy units, based on the total moles of condensed diorganosiloxy units in the epoxysilicone,
    (B) 1 to 25 parts of a compatibilizer in the form of a mixture of
        (i) 1 to 25 parts of a $C_{(8-20)}$ alkylphenol and
        (ii) 0 to 15 parts of a $C_{(4-12)}$ alkanediol, and
    (C) an effective amount of a polyarylonium hexafluorometal, or metalloid salt, substituted with at least one nuclear bound alkoxy radical having at least 8 carbon atoms selected from the class consisting of diaryliodonium salts and triarylsulfonium salts.

2. A UV curable epoxysilicone composition in accordance with claim 1, where the diaryliodonium hexafluorometalloid salt is (4-octyloxyphenyl)phenyliodonium hexafluoroantimonate.

3. A UV curable epoxysilicone composition in accordance with claim 1, where the triarylsulfonium salt is bis(4-dodecyloxyphenyl)phenylsulfonium hexafluoroantimonate.

4. UV curable epoxysilicone composition in accordance with claim 1, where the epoxysilicone is a poly(dimethylmethylepoxycyclohexylethyl)siloxane.

5. A UV curable epoxysilicone composition in accordance with claim 1, where the epoxysilicone has chemically combined units of the formula

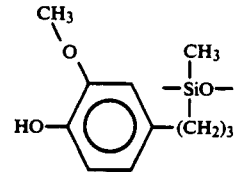

6. A UV curable epoxysilicone composition in accordance with claim 1, where the epoxysilicone has chemically combined units of the formula,

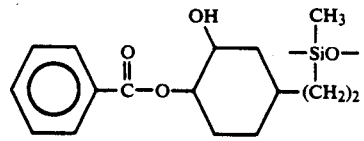

7. UV curable epoxysilicone composition in accordance with claim 1, where the alkanediol is 2-ethyl-1,3-hexanediol.

8. UV curable epoxysilicone composition in accordance with claim 1, where the alkylphenol is dodecylphenol.

* * * * *